April 25, 1933.  A. DINA  1,905,816

MOTION PICTURE PROJECTION MACHINE STRUCTURE

Filed Nov. 30, 1929    4 Sheets-Sheet 1

INVENTOR
Augusto Dina
BY
Howard W. Dix
ATTORNEY

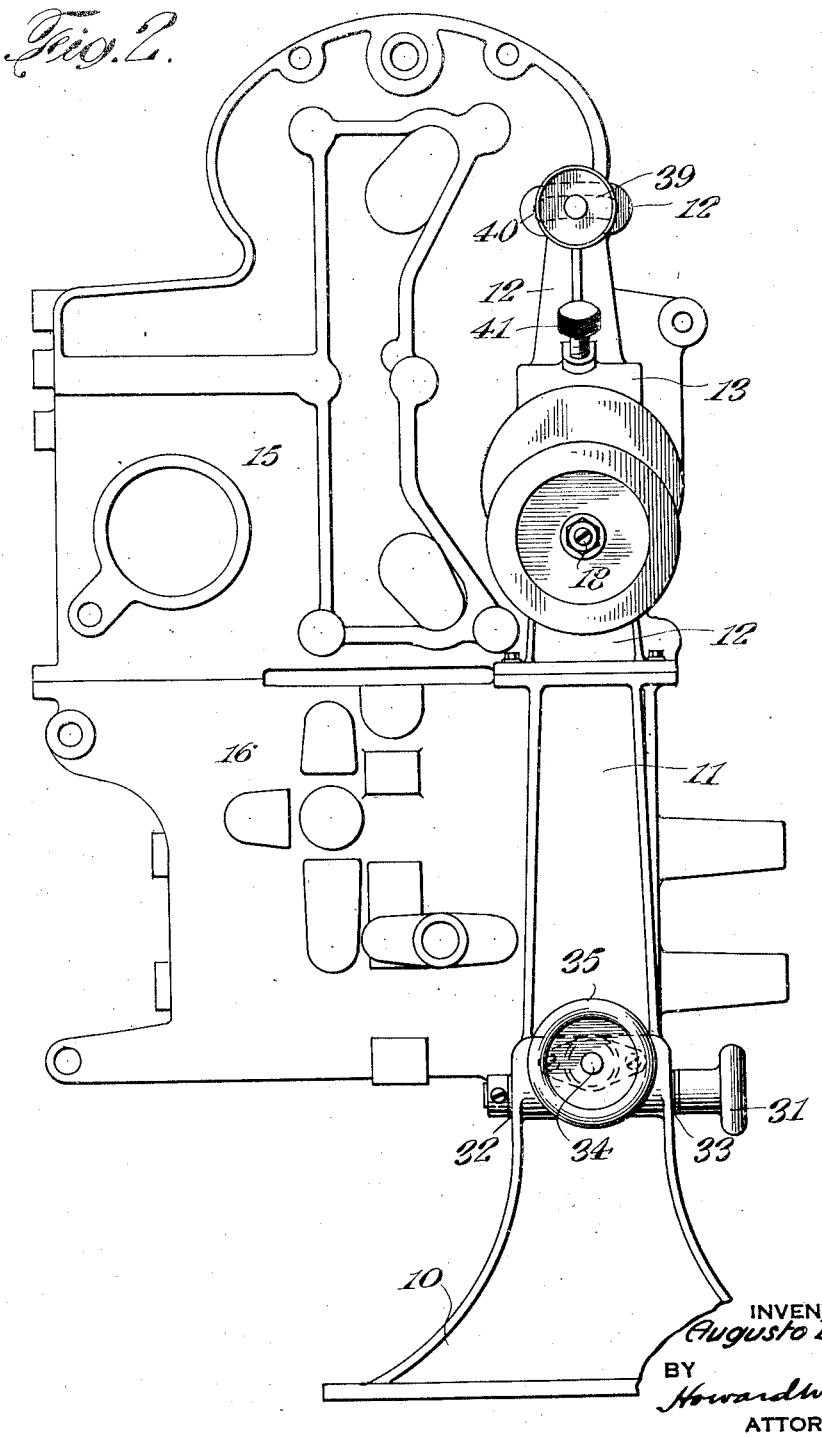

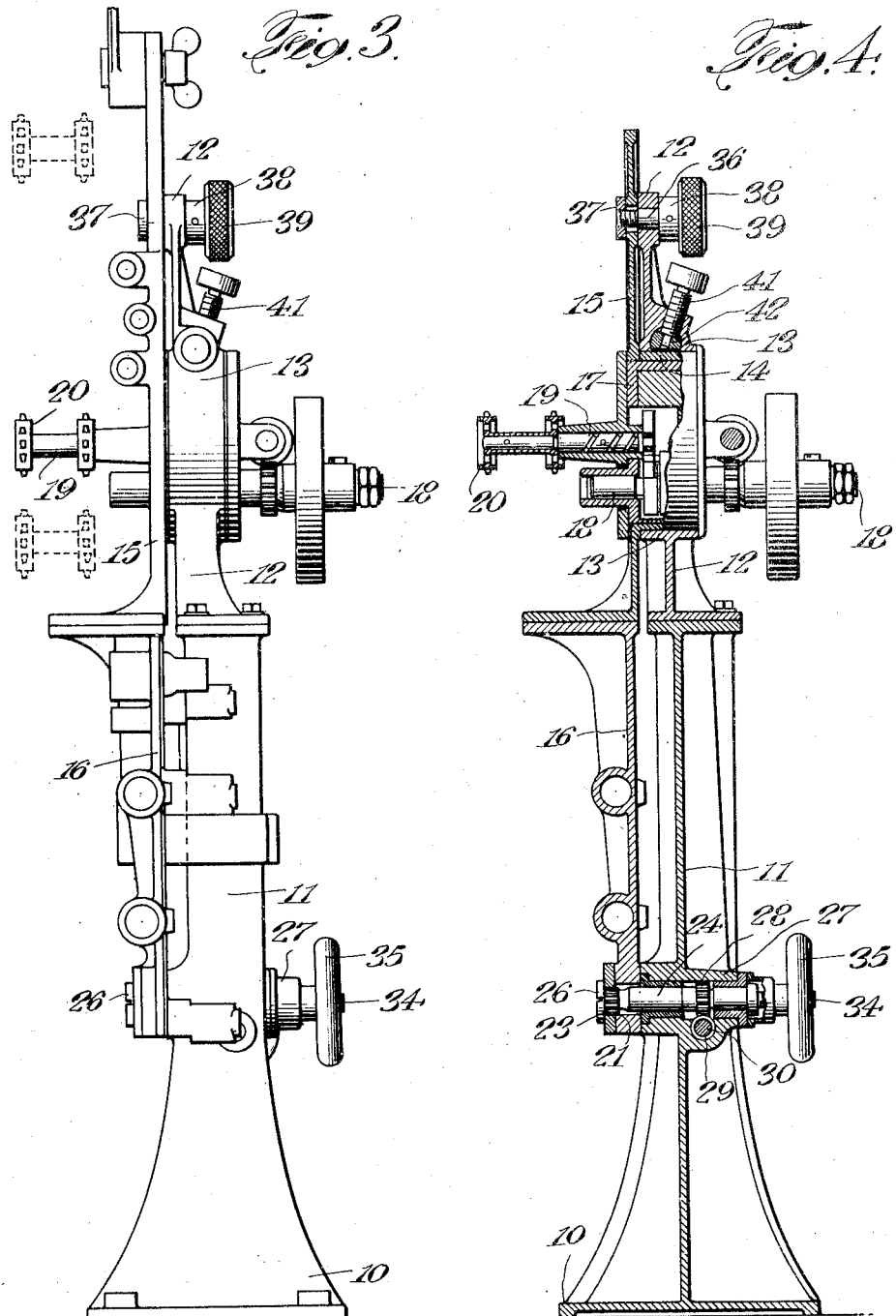

April 25, 1933.   A. DINA   1,905,816
MOTION PICTURE PROJECTION MACHINE STRUCTURE
Filed Nov. 30, 1929   4 Sheets-Sheet 4
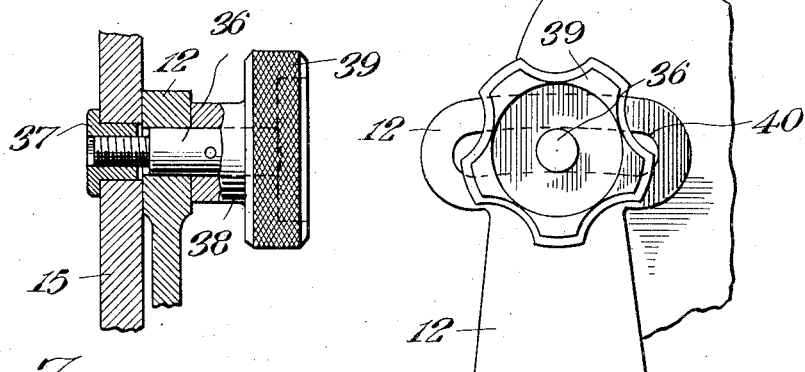
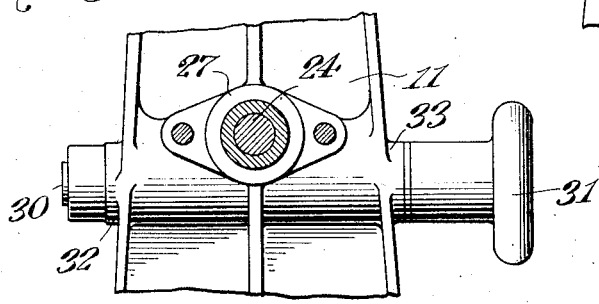
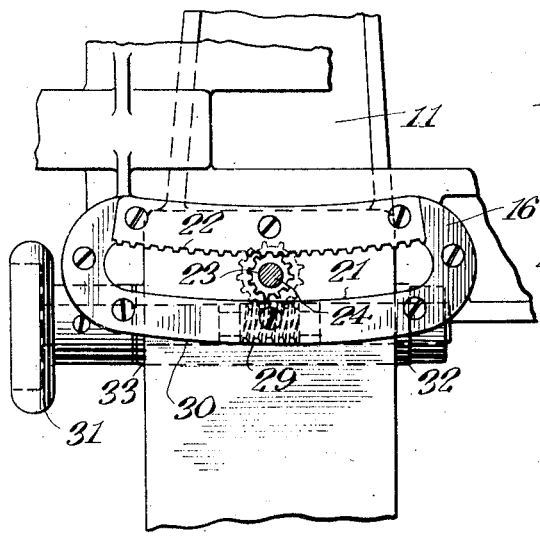
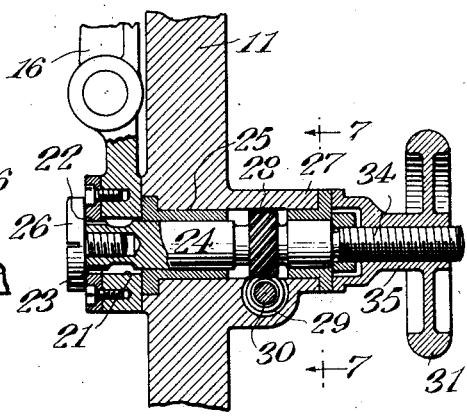
INVENTOR
Augusto Dina
BY
Howard W. Dit
ATTORNEY Patented Apr. 25, 1933

1,905,816

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

MOTION PICTURE PROJECTION MACHINE STRUCTURE

Application filed November 30, 1929. Serial No. 410,829.

This invention relates to new and useful improvements in motion picture projectors and has especial reference to improvements in mountings for the operating elements thereof.

A main object of the invention is to so mount the head of the machine that the effect of any vibration caused by the moving elements mounted on the head will be reduced to a minimum. Thus any vibration caused by the operation of the moving elements will be substantially eliminated in so far as it affects the projection of the picture.

A further object is to provide a compact, rugged, and simple mounting so that the head may be readily adjusted on the mount even while the machine is running and with the utmost ease and the highest degree of accuracy and refinement.

A further object is to so mount the head and its frame-supporting mechanism, that any adjustment of the frame and the head will to a minimum amount disturb the adjustments and settings of the other various parts within the mechanism.

A still further object is to provide a head and supported mechanism with such a mounting and so adjustable thereon that the minimum dynamic disturbance is created when the frame is adjusted especially while the machine is running.

Further and more specific objects, features, and advantages will more clearly appear from the detailed description given below when taken in connection with the accompanying drawings which form part of the specification and which illustrate one present preferred form of the invention.

When the invention is contemplated in general terms it will be observed that it includes providing an improved mount or support for the projector head and that the support and head are so designed that the head may be adjusted on the support about an axis that coincides with the axis of one of the moving parts of the mechanism.

In the prior types of projection machines, the machine is constructed to be tilted about a pivot point in order that the picture may be thrown on the screen which is located at some point below or above the level of the machine. The operating intermittent mechanism which moves the film step by step in front of the light aperture is mounted at some distance from the pivot point above referred to. With this condition existing where the center of the greatest dynamic disturbance, namely that of the intermittent mechanism, is located at a distance from the pivot point, any vibrations of the intermittent or other operatings mechanisms are amplified by reason of the moment arm equal to the distance between the pivot point and the center of the disturbance.

The elimination or material reduction of these vibrations has been one of the outstanding problems of the projection machine industry for a long period of time. When such amplified vibrations have existed it has been necessary to make a very large and heavy machine to absorb the vibrations so that they would not be conveyed and cause the picture on the screen to have the appearance of being shaken.

This above disadvantage has been eliminated by the improved construction presented herewith. It has been found after much careful study and analysis of the problem, that if the pivot point is disposed at the center of the greatest dynamic disturbance, the moment arm of this center is reduced to zero and the moment arms of the other disturbing elements are correspondingly reduced. After practical trials with several designs it was found that when the pivot point coincides with the axis of the intermittent mechanism, the effect of any vibrations has been practically eliminated and much lighter machines may be made to do the same work with a great saving of cost and space. The latter is especially important in theatre constructions.

Thus the intermittent mechanism, which is the most disturbing mechanism on the head, is disposed at the center of support of the whole head. The moment arm of any disturbing forces in the head will therefore be reduced to as low a figure as possible and the moment arm of the disturbing force produced by the intermittent mechanism will be reduced practically to zero. Also by having the projection mechanism pivotally mounted near the center thereof, the possibility of adjusting the head more easily occurs and the adjustment will not produce as much derangement or movement of the parts as would occur if the head were pivoted or adjustable about some off-center point.

More particularly the head is pivotally mounted on a support which in turn is mounted on a suitable base. This support or pedestal is provided with a journal which receives a portion of the head frame in the vicinity of the intermittent mechanism and preferably which includes the intermittent sprocket so that when the head is properly mounted and the head is swung around the pivot point, the axis of the intermittent sprocket is closely adjacent to, and in most instances is preferably in line with, the axis of swing or adjustment. In other words, the projection head frame is so pivotally mounted as to swing around the axis of the intermittent sprocket. The adjustment may be another movement than a swinging movement as long as the center of movement is at or near the intermittent mechanism and preferably centered with the sprocket axis as above stated.

Since this mechanism including this sprocket is the most disturbing mechanism of the head as far as is concerned the vibrations thereby produced, these will practically disappear. The invention further concerns the provision of simple and efficient means whereby the head frame may be easily and readily adjusted on the support and locked in any desired adjusted position.

The invention is more particularly shown in the drawings, in which, the preferred form is illustrated and in which, Fig. 1 is a side elevation of the head frame and the support without showing all the mechanism on the frame;

Fig. 2 is a side elevation of the opposite side of the device;

Fig. 3 is an end elevation of the device;

Fig. 4 is a vertical cross section through the device;

Fig. 5 is a partial elevation of the locking or clamping means disposed at the top of the head frame support;

Fig. 6 is a partial elevational section thereof;

Fig. 7 is a side elevation partly in section of the lower clamping and adjusting means for the head frame;

Fig. 8 is a similar elevation of the same device from the opposite side; and,

Fig. 9 is a vertical cross section through the device shown in Fig. 8.

Figure 1:
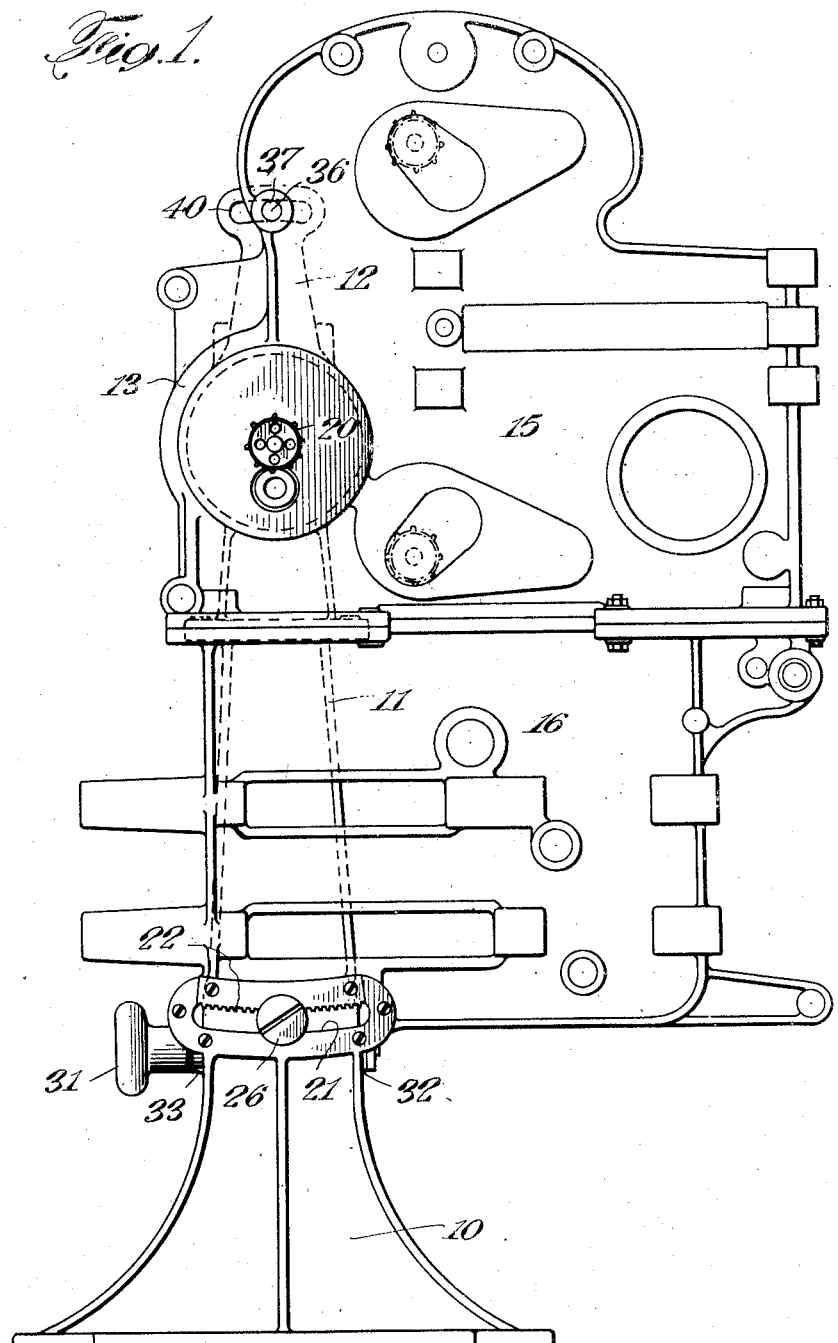

While the invention may be embodied in many forms, that shown in the drawings is the preferred present form and comprises a base 10 from which upwardly extends a pedestal member or support formed of lower and upper sections 11 and 12 respectively. The upper element 12 of the support is provided with a rather large circular annular journal member 13. This member 13 is adapted to receive a circular annular shaped bearing member 14 extending outwardly from the upper portion 15 of the projector frame to which a lower portion 16 is suitably fastened as by bolts.

Disposed within the bearing annulus 14 there may be and in the form shown, preferably is a box or casing 17 which may be the usual box containing the intermittent mechanism of the projector and may be of any desired type altho the form shown includes a pin wheel shaft 18, a star wheel shaft 19 and a sprocket 20. In the form shown the box or casing and the center of the journal 13 are disposed in line with the axis of the sprocket 20. Thus, the whole projector mechanism frame is disposed for swinging or tilting movement around the bearing annulus 14 and, in the form shown, around the axis of the film sprocket 20 which, as is often the case, is the most disturbing element of the machine from the standpoint of vibration effects. It is of course understood that one of the chief ideas is to support the projector frame from some point adjacent the center of the mechanism and from a point in the vicinity of the intermittent movement and that in this endeavor it was found that one preferred form of suspension was to make the suspension axis the axis of the intermittent film sprocket. In this manner the point or neighborhood of the greatest dynamic disturbance in the projector is disposed right near the point of support for the pivoting of the entire frame and therefore the moment arm of such a disturbing area around the pivot is reduced substantially to zero and the effect of the disturbances on the machine as a whole is reduced practically to nothing.

For its adjustment, the lower end of the projector frame portion 16 is provided with an arcuate slot 21 one edge of which is provided with teeth 22 engaged by a gear 23. This gear 23 is on a shaft 24 extending transversely through the adjacent lower end 11 of the support and through a bearing sleeve 25 therein. A threaded cap 26 holds the shaft 24 in position. The shaft 24 extends through a lateral housing 27 on the support portion 11 and has thereon and within the housing 27 another gear 28 in the form of a worm gear meshing with a worm 29 on a shaft 30. This shaft 30 has an operating handle 31 thereon at one end and is journalled in bearing members 32 and 33 on the frame portion 11.

The shaft 24 extends through the housing 27 and has a threaded end 34 which receives a cap handle 35. When the member 35 is screwed tight against the end of the housing 27 the shaft 24 can not be turned and this action acts as a lock for the shaft to prevent the movement of the frame after it has been adjusted in any desired position. It will be observed that when the worm shaft 30 is turned, the gear 28 will be turned and through this the gear 23 will be turned. This gear 23 will actuate the teeth 22 and thus oscillate the frame element or portion 11 around the axis of the bearing member or annulus 14 above described.

To further insure the clamping of the frame in the desired position, there is provided at the top of the frame element 12 a clamping shaft 36 threadedly engaged with a bushing 37 in a bore in the upper end of the frame member 15. The other end of this shaft 36 has fastened thereto a hub 38 having an operating handle 39 thereon. The upper end of the supporting member 12 has a curved slot 40 therein through which the shaft 36 projects. By tightening or loosening the handle 39 the edge of the hub 38 will be clamped against the adjacent edge of the support member 12 to hold the frame member 15 in any desired adjusted position.

In Figs. 3 and 4 there is a threaded screw 41 in a bore on the top of the journal member 13 and this can be adjusted to clamp down on to a friction plate 42 disposed loosely against the top of the bearing member 14 to additionally clamp it in place when desired.

Having thus described in detail the construction of what is now thought to be the preferred form of the invention, it is apparent, in considering the invention in its broadest aspects, that there has been provided a simple, compact, efficient support for a moving picture projector mechanism, in which it is supported from a journal and bearing arrangement disposed somewhat in the vicinity of the mechanical center of the mechanism and preferably, as shown in the drawings, in the immediate vicinity of the intermittent mechanism, and more particularly disposed for swinging movement around the axis of the intermittent film sprocket. The support is connected to the mechanism-supporting frame somewhere within the outlines of the frame preferably, but even if the point of connection of the support should lie outside of the frame outlines, nevertheless the point is located in the vicinity of the intermittent mechanism and therefore the vibration moment arms are reduced practically to zero.

Therefore, the whole mechanical movement has been hung from a point such that any adjustment of the frame as a whole around the point of support will cause a minimum movement of any of its parts with respect to that point and will cause a minimum movement of the intermittent mechanism. This will cause a minimum of disturbance when the frame is adjusted. The disposition of the support center near the mechanical center of the machine will reduce the moment arms of the disturbing vibratory forces and reduce the vibrations of the frame which in actual practice have been found actually to be practically nil.

While the invention has been described in detail and with respect to a preferred form thereof, it is not to be limited to such details and forms since many changes and modifications may be made and the invention embodied in other forms without departing from the spirit and scope of the invention in its broadest aspects. Hence it is desired to cover any and all forms coming within the language or scope of any one or more of the appended claims.

What is claimed, is,

1. In a motion picture projector, a frame supporting the projector mechanism and including the intermittent motion sprocket, a support for said frame, means for supporting said frame in said support for movement of the frame around the axis of said sprocket as a pivot.

2. In a motion picture projector a mechanism supporting frame, a support for said frame, an intermittent mechanism on said frame, and means for supporting said frame on the support for pivotal movement thereon around the axis of the intermittent movement of the sprocket.

3. In a motion picture projector, a support, a frame adapted for pivotal movement thereon, a journal on the support, an annular casing on the frame received in said journal, and an intermittent movement mechanism within said casing.

4. In a motion picture projector, a support, a frame adapted for pivotal movement thereon, a journal on the support, an annular casing on the frame received in said journal, an intermittent movement mechanism within the casing, said intermittent mechanism including a sprocket, the axis of the sprocket being alined with the center of the journal.

5. In a motion picture projector, a support, a frame adapted for pivotal movement thereon, a journal on the support, an annular casing on the frame received in said journal, an intermittent movement mechanism within said casing, means on the support and engaging the frame to move around the support; and means to lock the frame in any adjusted position.

6. In a motion picture projector, a support, a frame adapted for pivotal movement thereon, a journal on the support, an annular casing on the frame received in said journal an intermittent movement mechanism within said casing, a worm and gear mechanism connecting the support and the frame for the adjustment of the frame on the support, and means for locking said worm and gear movement to hold the frame in any adjusted position.

7. In combination with a motion picture machine having an intermittent sprocket, a support comprising a pedestal having a housing enclosing said sprocket, a frame adapted to carry said apparatus and pivoted to said housing about the axis of said sprocket, said frame extending substantially above and below said pivot point and clamping means carried by said pedestal substantially above and below said pivot point for clamping said frame thereto at said points.

In testimony whereof, I have hereunto set my hand.

AUGUSTO DINA.